United States Patent [19]

Mandell

[11] Patent Number: 5,108,169
[45] Date of Patent: Apr. 28, 1992

[54] CONTACT LENS BIFOCAL WITH SWITCH

[76] Inventor: Robert B. Mandell, 69 Sullivan Dr., Moraga, Calif. 94556

[21] Appl. No.: 659,167

[22] Filed: Feb. 22, 1991

[51] Int. Cl.⁵ .......................... G02C 7/04; G02F 1/13; G02B 27/42
[52] U.S. Cl. .................................... 351/161; 359/43; 359/44; 359/558
[58] Field of Search ............. 351/160 R, 160 H, 161, 351/162; 359/558, 43, 44

[56] References Cited

U.S. PATENT DOCUMENTS 3,794,414  2/1974  Wesley .................................. 351/161
3,962,505  6/1976  Avery .................................. 351/162

Primary Examiner—Scott J. Sugarman
Attorney, Agent, or Firm—Schapp and Hatch

[57] ABSTRACT

A bifocal contact lens which contains two optical powers and a structure which serves as a switch to determine which power is operative as the wearer looks alternatively at objects located at various distances. The lens switch is designed so as to be triggered by the upper lid as it covers and uncovers various portions of the contact lens when the lens wearer is looking alternatively at objects located at various distances.

14 Claims, 2 Drawing Sheets

CONTACT LENS BIFOCAL WITH SWITCH

Bifocal contact lenses are lenses which provide at least two optical powers, such powers being selected so as to correct the refractive error of a patient's eye for two or more distances. This invention relates to a bifocal contact lens construction in which the two optical powers are made operative on an alternating basis by a switch on the contact lens that is triggered from the difference in lid position when viewing far and near objects.

BACKGROUND OF THE INVENTION

At the present time, several bifocal contact lenses are available for public use but these are not considered very successful by the eyecare professions (see Bennett et al, 1990). Most present bifocal contact lenses may be divided into two major types and several alternate designs of each type based on the location of the optical zones. Optical zones are those regions of the lens which provide an optical correction for good vision at specified distances for the wearer.

The two major types of bifocal contact lenses are the concentric zone type and the vertically separated zones or segment type as described in U.S. Pat. No. 3,684,357 and Josephson 1990. Each bifocal lens type may be formed of either hard or soft materials. The concentric type is the oldest form of bifocal contact lens. It has two optical zones which are placed concentrically in a bullseye fashion. Depending on the lens design either the distance or near optical zone may be in the most central portion of the lens which is surrounded concentrically by the alternative of the distance or near portion. The optical zones are produced by having two different radii of curvature on either the anterior or posterior lens surface.

The concentric bifocal lens usually functions by what is known as the simultaneous vision principle. To accomplish this, the optical portion of the lens must have such dimensions that, when worn on the eye, both the distance and near optical zones cover a portion of the wearer's entrance pupil so that light passing through both distance and near zones will contribute to the retinal image. The disadvantage of the simultaneous image principle is that the retinal image is composed of light from both distance and near objects of view simultaneously and the image is never completely clear. When the subject looks at a distant object the light from near objects which passes into the entrance pupil forms an out-of-focus veiling effect on the retinal image and when the subject looks at near objects there is the same type of veiling effect from the distance light. This retinal veiling, sometimes called fogging, or blur, has severely limited the ability of most subjects to tolerate a simultaneous vision type of lens correction, although in a few circumstances the patient may learn to ignore the veiling image and use the lens with a limited degree of success. Vision may also be enhanced if some translating movement of the lens occurs to shift the lens either up and down or sideways so that the subject sees through a greater proportion of either the distance or near optical zone. Unfortunately, the shifting action of the lens is usually insufficient or unreliable to be effective in producing the necessary lens translation to move the lens back and forth in order that the wearer may see alternatively between distance and near optical zones to accomplish the alternating form of visual correction.

Another design of the concentric bifocal contact lens consists of a lens with aspherical curves on either the front or back surface as revealed in U.S. Pat. No. 3,482,906. The back surface of the lens has a varying radius of curvature which, beginning in the geometric center of the lens, has the radius needed to produce the contact lens power for the eye's correction for its distance refractive error and changes to radii that are longer and longer in lens positions towards the periphery. This lens has the advantage that there is no sharp transition between the distance and near optical zones of the lens, but rather a continuous optical power change in going from the center to the periphery of the lens. The aspheric bifocal lens suffers from the same drawbacks as other concentric lens designs, however, in that when worn on the eye, there is a variation of optical power of the lens for light which passes into the subject's entrance pupil, which produces a retinal image that does not have the optimal focus for the individual. An aspheric bifocal may function more effectively if the lens can be made to shift as the subject looks from distance to near, but it is an exceptional patient when this occurs reliably so that the patient can see well at both far and near distances. As an alternate design, an aspheric bifocal can be produced by forming an aspherical curve on the front surface of the contact lens, such lens functioning on the eye in essentially the same way as when the aspherical curve is on the posterior surface.

A novel variation of the concentric zone bifocal is the diffraction bifocal design, which utilizes a series of concentric surface zones in the form of a Fresnel half-wavelength zone plate as revealed in U.S. Pat. No. 4,210,391; U.S. Pat. No. 4,641,934 and U.S. Pat. No. 4,655,565. This lens is sometimes termed a "full aperture bifocal" and has been made from both RGP and hydrogel materials. The principle of diffraction has considerable advantage over refraction, in that it requires no appreciable lens thickness which is greater than single-vision designs.

The mechanism for the deviation of light by diffraction requires a fine facet or eschelet only a few $\mu$m high on the posterior lens surface which asymmetrically retards transmitted light such that it is in phase at the near focal point. The finer the structure, the greater the deviation. The rulings on a contact lens take the form of concentric circles, and the greater deviation angle required at the periphery of the lens means that the separation between the circles becomes less towards the periphery. By careful selection of the zone widths, it is possible to manipulate the light mainly into two images and create a simultaneous vision contact lens.

In contrast to the two-zone bifocals, the diffractive bifocal always has many zones covering the area of the pupil, and hence the division of the incident light into two images occurs at every small area of the lens. Consequently, as the pupil changes size, the proportion of light for the distance and near remains constant. In addition, this ratio is constant for various patients with different pupil diameters.

The principle disadvantage of the diffractive bifocal is that out-of-focus light is always superimposed on the image that is in focus. Hence, when the patient looks at distance, the out-of-focus light from near objects produces a blurring or hazing of the visual field. In this respect, the lens suffers from the same drawback of simultaneous vision as a two-zone bifocal, although less hazing effect is claimed. Most complaints occur when the lens is worn at night.

The second major type of bifocal contact lens is the vertically stacked zone lens or segmented bifocal as described in U.S. Pat. No. 3,597,055. This lens design requires some method of stabilizing meridional orientation of the lens when worn on the eye so that the distance optical zone stays at the uppermost position of the lens, a design feature which is usually accomplished by the use of prism ballast. The lens is generally fitted so that its lower edge will rest upon the lower lid when the wearer looks at a distant object. As the eye looks down to view a near object, the cornea moves downward relative to the lower lid with the result that the lens is pushed upward by the lower lid. This positions the lower optical zone of the lens, which contains the optical correction for near vision, in front of the pupil. This type of lens depends upon translation of the lens to the proper position whenever the eye gazes from distance to near or returns. This lens often fails because of the lack of adequate movement of the lens to bring the near optic zone to a position in front of the entrance pupil, when viewing near objects. In addition, the lens often fails because of discomfort which may be due to the thick lower edge of the prism ballast design or other methods which are used to establish meridional orientation. In general, mechanical forms of bifocal lens shifting by the lids have been too unreliable for a high degree of success.

Previous bifocal contact lens designs have utilized the lids to move all or part of the contact lens so as to position the desired distance or near optical zone in front of the entrance pupil at the desired time such as revealed in U.S. Pat. No. 4,302,081; U.S. Pat. No. 4,614,413 and U.S. Pat. No. 4,728,182. A contact lens has also been revealed in U.S. Pat. No. 4,702,573 in which the lid induces a change in lens shape to produce an optical power change.

It should be noted that all of the bifocal lens designs which have been described have been composed of either rigid or flexible materials including PMMA, silicone methacrylate, fluorosilicone acrylates, fluoropolymers, silicone resin, silicone elastomer, hydrogel contact lenses of water contents ranging from 30 to 90% (it would be no different for water contents outside this range), butylacrylates and all similar materials known to have properties which allow the construction of a contact lens. My following invention will also apply to lenses made from all of these materials as well as other materials suitable for making contact lenses of any rigidity.

PRESENT INVENTION

The present invention differs from all previous bifocal contact lenses in that it contains a switch in the form of a sensor material or body which changes the optical correction for distance or near vision, such switch being initiated by one or both lids acting as a trigger. An objective of the present bifocal contact lens invention is to activate the lens power change by triggering a sensing mechanism on the lens with the lid, without moving the lens, although some lens movement may occur without nullifying the invention. The invention involves the placing of a sensor material on the contact lens in such a way so as to convey a signal from the lid or lids that either the optical power for distance or near vision correction is required.

PREFERRED EMBODIMENTS OF THE INVENTION

For the average individual, when the eye is open and gazing straight ahead at a distant object, the lids in a natural position are separated by a distance of about 10.5 to 11.5 mm. When the average person looks down to read, the upper lid moves downward by a distance of 3 to 4 mm and there is a small inward movement of the lower lid. For a person who is wearing a contact lens, the area of the contact lens that is covered by the lids is therefore much greater in the reading position. If the periphery of the contact lens now contains a material which is sensitive to some stimulus that is induced by the upper lid, then the lid coverage of the lens periphery during reading can act as a trigger or initiator of the method for transforming the lens into a near power correction.

Figure 1:
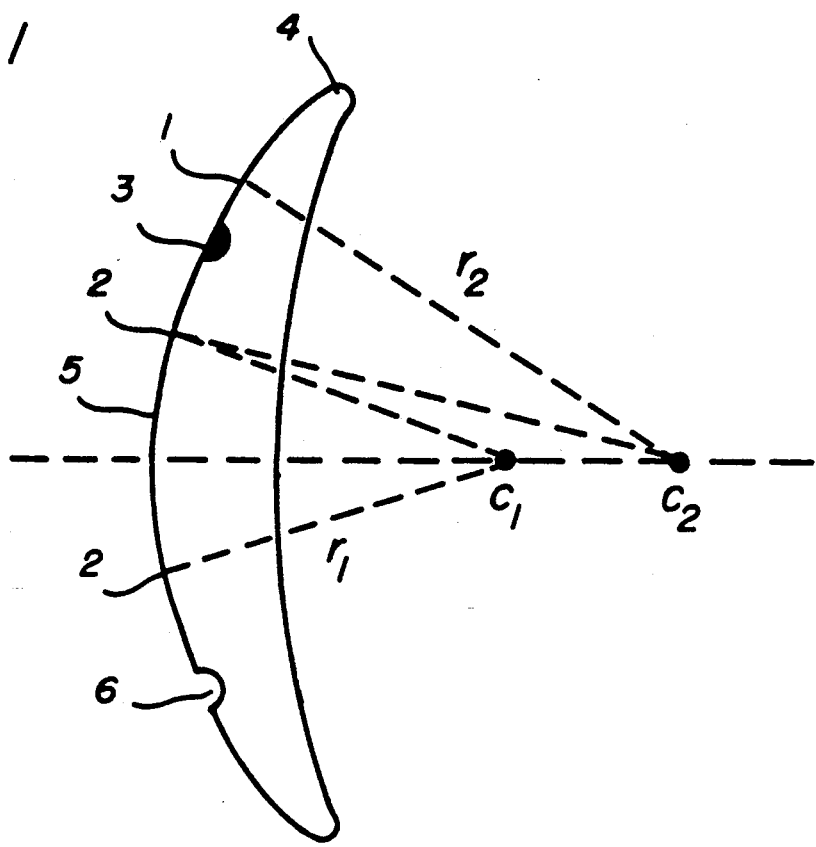
FIG. 1 is a cross-section view of an embodiment of the bifocal lens.
Figure 2:
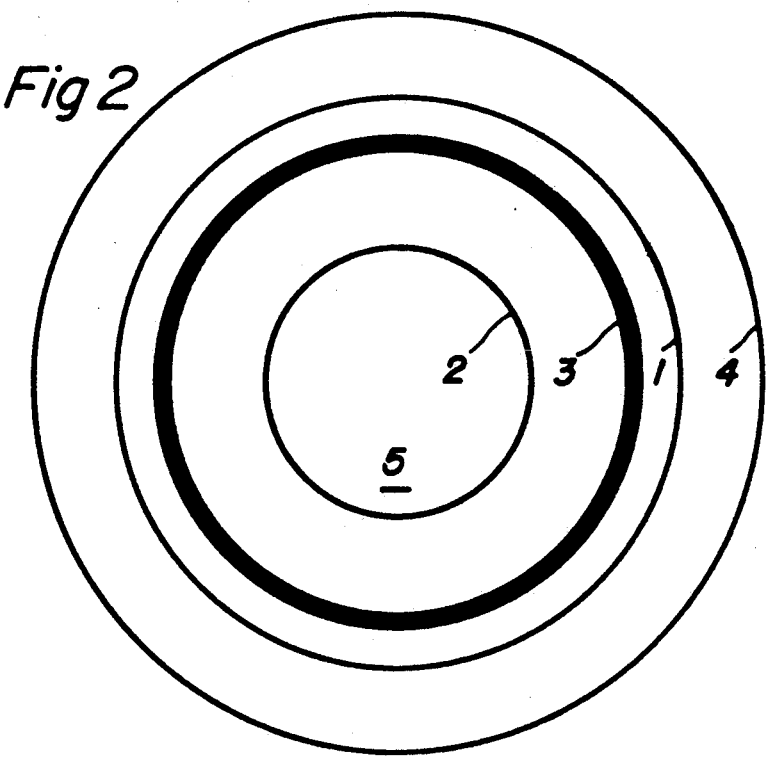
FIG. 2 is a plan view of the anterior surface of the lens of FIG. 1.

One embodiment of this invention consists of a rigid concentric bifocal lens made from silicone acrylate material and modified in the following way. A cross section of the lens is shown in FIG. 1 in which the front surface consists of a distance optical zone with outer diameter 1 and inner diameter 2 containing a gold wire 3 located about two millimeters from the lens edge 4 and surrounding concentrically a near optical zone 5 located at the center of the lens. After cutting and polishing the front surface of the lens to produce the appropriate power for a distance refractive correction, the lens, which is still mounted on the arbor with pitch, is remounted on the lathe and the diamond cutting tool advanced forward at a position approximately two mm inward from the lens edge towards the center. A narrow groove 6 is cut in the front surface of the contact lens in the region of the distance optical zone, such cut being formed by the shape of the diamond tip to produce a small semi-circular groove 6 of approximately 0.5 mm chord width. With the lens still remaining on the arbor, a small gold wire 3 is fixed into the newly formed groove on the contact lens with epoxy. FIG. 1 illustrates the groove 6 both without the wire and with the gold wire 3 for illustration only and the final lens will contain the wire 3 throughout the entire groove as shown in FIG. 2. When the epoxy is set, the lens is remounted on the lathe and a new surface cut is made to trim excess gold material and bring the surface of the gold into a continuous curve with the distance optical zone front surface. Next, the lens is removed from the arbor and finished in the usual way by adding any required peripheral curves on the posterior surface and edging. The lens is next coated with a liquid crystal material on the front surface, over the area of the gold wire and immediately adjacent thereto to cover the distance optical zone from its inner diameter 2 to its outer diameter 1. The liquid crystals are sensitive to heat and are transformed at about 95° F. For this embodiment of the invention the gold wire 3 and the liquid crystal material constitute the lens switch.

Figure 3:
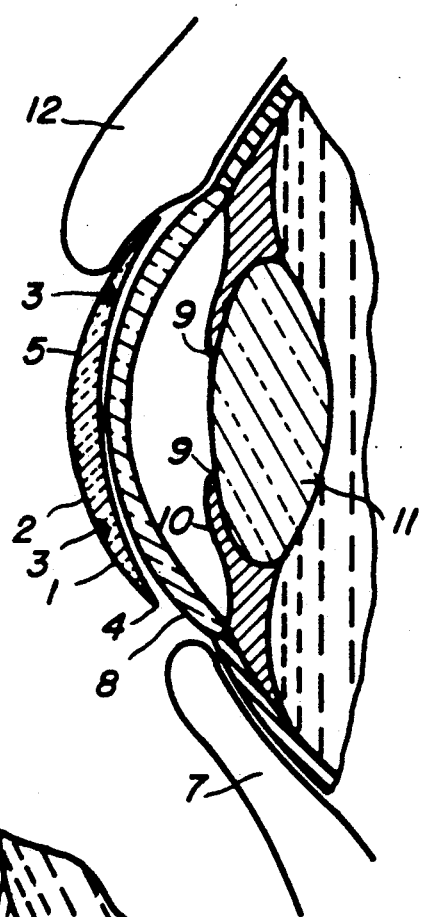
FIG. 3 is a cross-section view of an embodiment of the bifocal lens along with the cornea, crystalline lens and iris of the eye when the wearer is looking at a object located at a far distance.
Figure 4:
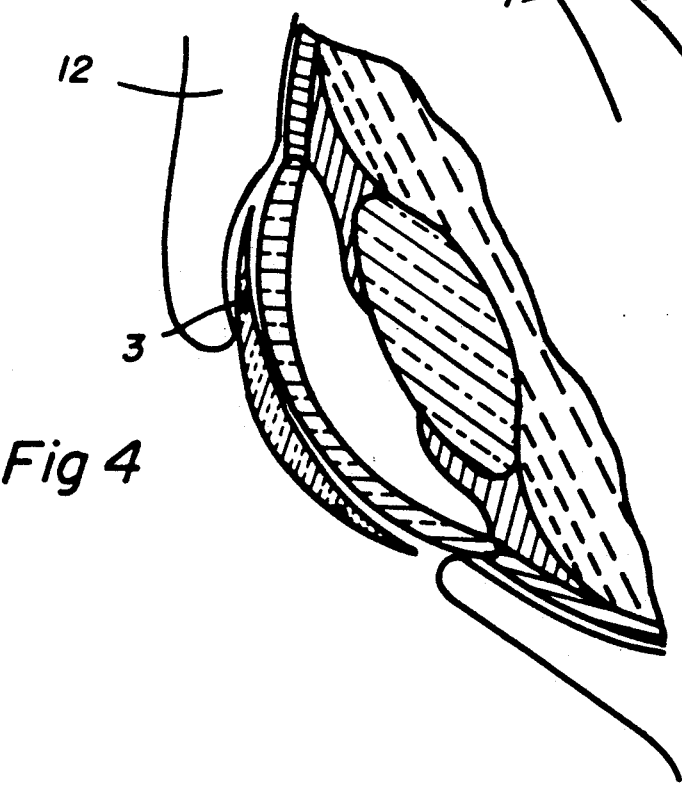
FIG. 4 is a cross-section view of an embodiment of the bifocal lens along with the cornea, crystalline lens and iris of the eye when the wearer is looking at an object located at a near distance such as that which is required when reading.

FIG. 3 illustrates a cross section of the bifocal lens along with the ocular structures consisting of the lower lid 7 cornea 8 pupil margin 9 iris 10 crystalline lens 11 and upper lid of the eye 12. When the contact lens of FIG. 1 is placed on a subject's eye, it is found that as long as the subject looks straight ahead as shown in FIG. 3 the eyelids 7 and 12 are held away from the gold wire 3 on the contact lens and the area of the contact lens immediately adjacent to the gold wire consisting of the distance optical zone remains clear. However, when the subject looks down to read as in FIG. 4, it is found that the upper lid 12 partially covers the lens and the gold wire 3. Soon afterward the area of the distance optical zone of the contact lens which was over the gold wire, or immediately adjacent to it, becomes darkened. This darkening effect is produced by the conduction of heat from the inner surface of the lid around the gold wire. Since the normal corneal temperature is about 92° F. and the temperature beneath the upper lid is about 96° F. or higher, there is a heat differential between the lid and the cornea.

By placing the gold wire 3 in the distance optical zone of the contact lens, it is found that the subject can gaze in the straight ahead position, without the lid covering the wire. At the straight ahead position, both the distance and near optical zones of the contact lens remain clear. When the subject looks at a near object, however, the upper lid then covers a portion of the gold wire and heats the wire throughout its circle on the contact lens. This action produces a darkening in the distance optical zone in which the gold wire resides by transforming the liquid crystal coating of the distance optical zone to a darkened state adjacent to the wire leaving only the central near optical zone in the lens optically clear. This improves the optical properties contributing to the retinal image formation by eliminating light from the distance optical zone from entering the pupil.

It is possible to place the gold wire at different positions on the lens to accommodate the variations in lid structure of different patients and the dimensions described may vary for different lens diameters or patient eye dimensions. With some lens configurations the lower lid may also play a role in activating the lens switch.

It is recognized that various combinations of distance and near viewing areas could be produced on the lens by the appropriate placement of the gold wire and a combination of the temperature sensitizing material. A bipartite arrangement in which each half of the lens was given either a distance or near refractive correction would still allow lens rotation without image shift if a monocentric construction were used.

It is also noted that many different materials are available which can be used for this purpose but are too toxic to be allowed to come in contact with the eye. This problem can be solved by layering the wire and photosensitive material inside the contact lens in a sandwich arrangement.

The same principle described here might also be used with prism ballast and/or stacked type bifocals to eliminate a portion of the lens area from light transmission during distance or near gaze. Furthermore, any present type of bifocal contact lens design would be amenable to modification and incorporation of this technique.

Another alternate form of this invention might consist of a contact lens in which the central portion has a second layer which consists of material of variable refractive index which is sensitive to temperature change. A gold wire is placed around the periphery of the variable index section. As the lid moves down over the upper portion of the gold wire during near viewing, the lid trigger to the gold wire initiates a change in the refractive index of the material. By increasing the refractive index, the refractive power of the central portion of the contact lens is increased which allows for a proper correction for near vision. When the lid is raised, the area is cooled and the refractive index is lowered which establishes the proper central lens power to correct for distance vision. By the proper choice of material and temperature conditions, it is possible for this lens to have a continuously variable power in proportion to the temperature change that is produced as the lid covers a greater and greater area of the wire. Hence, this would result in a truly continuous focus lens. It is also recognized that more than one gold ring may be used in a pattern of spokes, or some other configuration which may better conduct the heat from the lids to a more central portion of the contact lens.

Another alternate form of my lens would be an improvement of the currently available diffraction bifocals. These bifocals suffer because only 40% of the light passing through the visual area of the lens is available for either distance or near vision and there is a veiling effect from the unfocused light. The lid sensor principle may be used with diffraction bifocals to selectively block out the unwanted lens areas during either distance or near vision. Alternatively, liquid crystals may be used to form a pattern on the lens which will produce images by diffraction. Since liquid crystals function on the basis of light interference, the heat sensor principle may be used to alter the state of the crystals when vision is changed back and forth between distance and near vision so that two or more lens focal powers are produced.

The principal of the present invention may be applied to a corneal lens, in which the lens diameter is less than the cornea or a scleral lens, in which the lens diameter is equal to or grater than the corneal diameter.

The principal of the present invention may be applied to trifocal or multifocal contact lenses by applying the switch structure to the lens in such a way that the lid will activate the switch in sequence with the various optical zones which are desired to be operative.

It should also be noted that this same method may be used to measure temperature beneath the eyelids and by using different sensor materials could be used to form sensors which are sensitive to other body functions such as pH, $pO_2$, or $pCO_2$.

I claim:

1. A bifocal contact lens, comprising:
   a body of refractive material including two zones of different power; and
   a layer of eyelid-heat sensitive material borne by said body;
   said layer being so distributed as to substantially reduce the passage of light through one of said zones when it receives heat from an overlying portion of an eyelid.

2. A bifocal contact lens as claimed in claim 1, further comprising a ring of thermally conductive material underlying said layer and in heat conducting relationship therewith.

3. A bifocal contact lens as claimed in claim 1 in which said zones are collocated in a concentric relationship.

4. A bifocal contact lens as claimed in claim 1 in which said zones are collocated in a vertical relationship.

5. A bifocal contact lens as claimed in claim 1 in which said layer is comprised of liquid crystal material.

6. A bifocal contact lens as claimed in claim 1 which has distance and near foci produced by diffraction optics.

7. A bifocal contact lens as claimed in claim 1 which takes the form of a corneal contact lens.

8. A bifocal contact lens as claimed in claim 1 which takes the form of a scleral contact lens.

9. A bifocal contact lens as claimed in claim 2 in which said zones are collocated in a concentric relationship.

10. A bifocal contact lens as claimed in claim 2 in which said zones are collocated in a vertical relationship.

11. A bifocal contact lens as claimed in claim 2 in which said layer is comprised of liquid crystal material.

12. A bifocal contact lens as claimed in claim 2 which has distance and near foci produced by diffraction optics.

13. A bifocal contact lens as claimed in claim 2 which takes the form of a corneal contact lens.

14. A bifocal contact lens as claimed in claim 2 which takes the form of a scleral contact lens.

* * * * *